Sept. 24, 1963 T. B. DALTON 3,104,891
LANDING GEAR FOR SEMI-TRAILERS AND THE LIKE
Filed Jan. 8, 1962 2 Sheets-Sheet 1

INVENTOR.
THOMAS B. DALTON
BY
Barnes, Kisselle, Raisch & Choate
ATTORNEYS

Sept. 24, 1963  T. B. DALTON  3,104,891
LANDING GEAR FOR SEMI-TRAILERS AND THE LIKE
Filed Jan. 8, 1962  2 Sheets-Sheet 2
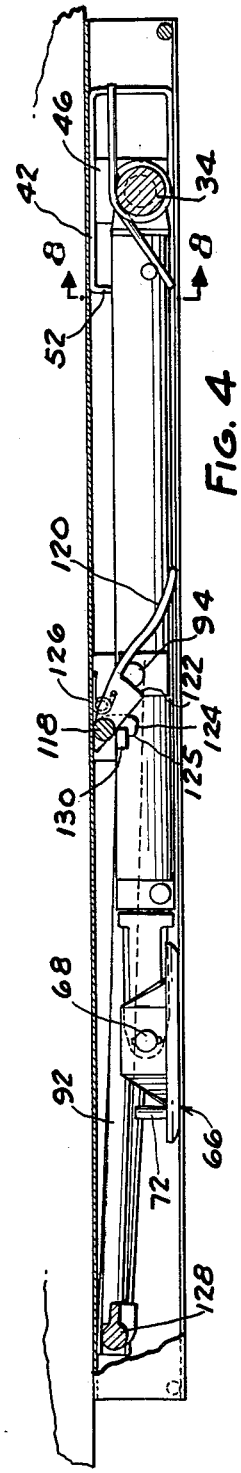
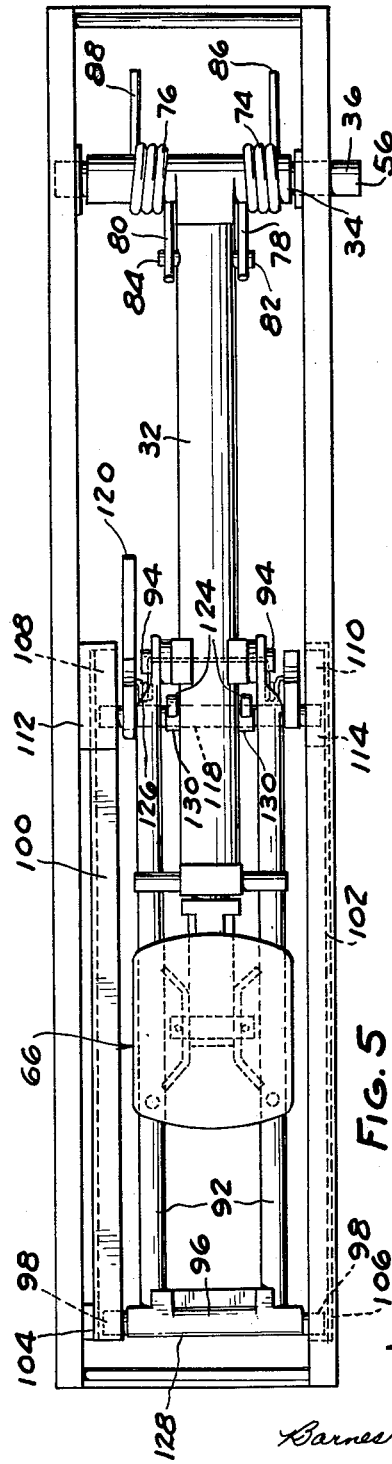
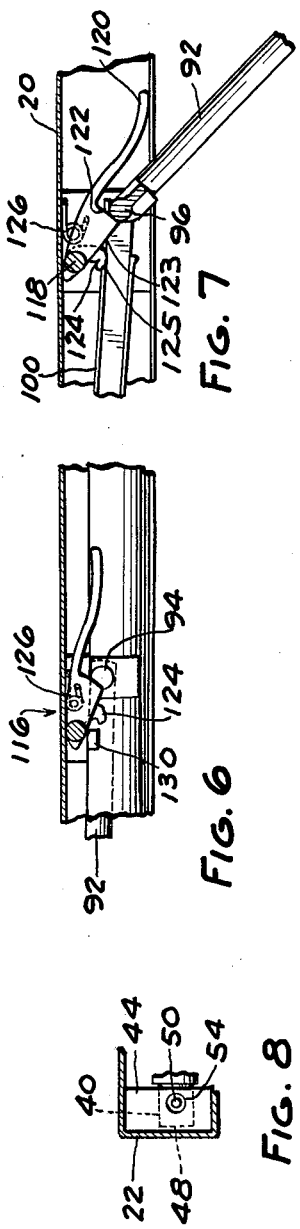
INVENTOR.
THOMAS B. DALTON
BY
Barnes, Kisselle, Raisch &
Choate
ATTORNEYS

United States Patent Office 3,104,891
Patented Sept. 24, 1963

3,104,891
LANDING GEAR FOR SEMI-TRAILERS
AND THE LIKE
Thomas B. Dalton, Muskegon, Mich., assignor to West Michigan Steel Foundry Co., Muskegon, Mich., a corporation of Michigan
Filed Jan. 8, 1962, Ser. No. 164,670
13 Claims. (Cl. 280—150.5)

This invention relates to landing gear of the type used to support the forward end of a semi-trailer when the semi-trailer is disconnected from its tractor or other prime mover. The legs in such a landing gear are usually retractable from their downward, ground-engaging, load-bearing position to an upward, retracted position to provide ground clearance during road use. In some cases, the legs are retracted merely by shortening them telescopingly; in other cases, they are swung upwardly; and in still other cases, they are both shortened and swung upwardly. The swinging type of retraction is preferred because it facilitates greater ground clearance.

Since the legs must have moving parts and still must be capable of bearing relatively heavy loads, the landing gear structure is usually quite heavy and bulky. This makes the gear hard to retract and lower, especially where a swinging construction is used. Some sort of gearing or other mechanical advantage device is usually necessary to swing the leg. This adds to the weight, expense, and general complexity of the gear.

The object of this invention is to provide a leg structure of the swinging type which is relatively simple, light weight, inexpensive, compact, and which can be manually swung between its downward and upward positions with relative ease and without the use of a mechanical advantage mechanism.

The invention generally contemplates a swinging leg structure which is spring biased toward its upward position so that the operator can easily swing the leg upwardly with spring assistance and can easily swing the leg to its downward position against the spring action with the assistance of the weight of the leg. The parts of the leg are constructed so that they will nest relative to each other within a small vertical space when the leg is folded up. A single, simple, easily operated lock is provided for locking the leg in both its downward and retracted positions. One form of the invention is shown in the accompanying drawings.

FIG. 4 is a side elevation of the landing gear in folded condition with parts broken away and shown in section to illustrate structure.

FIG. 5 is a generally bottom plan view of the landing gear in folded condition.

FIG. 6 is a fragmentary side elevational view of the gear in folded condition showing the lock in released condition, parts being shown in section to illustrate structure.

FIG. 7 is a view similar to FIG. 6 but showing the relation of the parts when the landing gear is unfolded and the lock is in locked condition.

FIG. 8 is a fragmentary generally sectional view on line 8—8 of FIG. 4.

Figure 1:
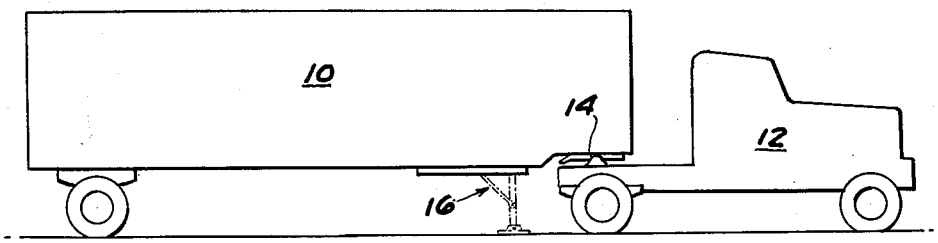
FIG. 1 is a diagrammatic view of a semi-trailer utilizing a landing gear according to this invention.

Shown in the drawings is a semi-trailer 10 connected to a tractor 12 through a conventional fifth wheel 14. Semi-trailer 10 has a landing gear structure 16 according to this invention mounted adjacent its forward end but rearwardly of its fifth wheel.

Figure 3:
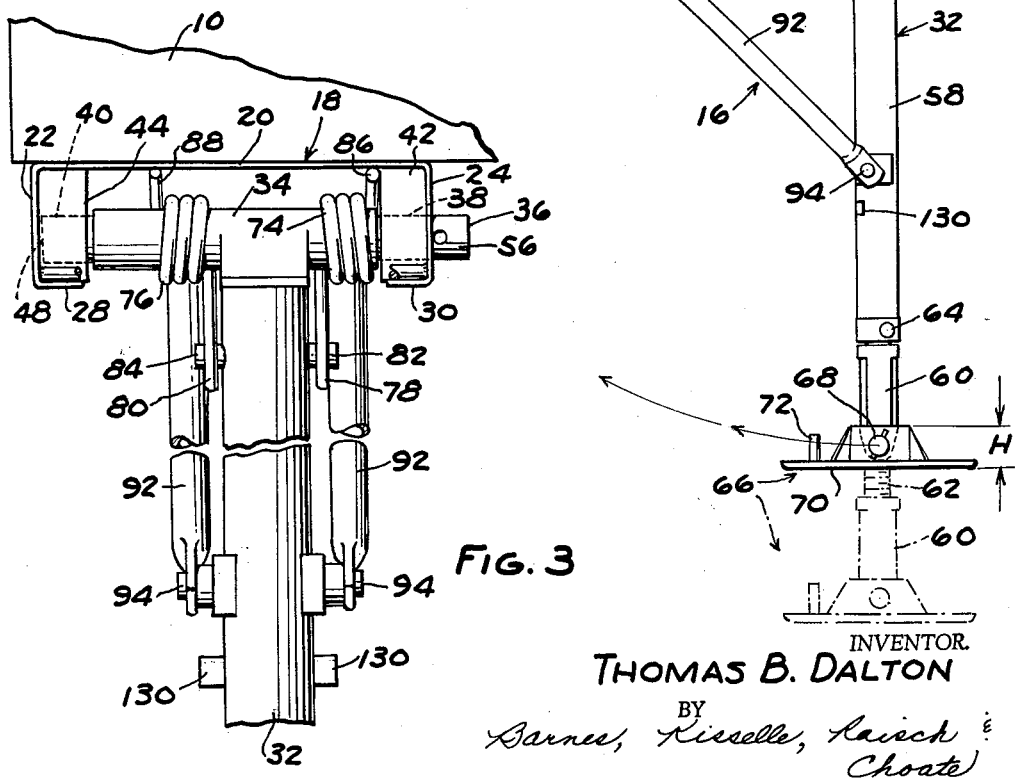
FIG. 3 is a further enlarged, fragmentary front elevation of the top portion of the landing gear.

Landing gear 16 includes a channel shaped frame 18 having a base portion 20 anchored to semi-trailer 10 by such means as welding or bolting (not shown). The channel has downwardly extending side walls 22 and 24 which are turned inwardly adjacent their lower ends at 28 and 30. As shown in FIG. 3, channel side 22 is disposed outwardly toward the side of trailer 10 and channel side 24 is disposed inwardly.

The landing gear leg 32 has a transverse tube 34 at its upper end which provides a bearing rotatably mounted around and supported by a trunnion 36. The trunnion is slidably inserted through openings 38 and 40 in two hollow reinforcing blocks 42 and 44 respectively. These blocks are anchored within the side portions of channel 18 such as by welding. The inner block 42 has a solid central portion 46 (FIG. 4) through which opening 38 extends. The outer end face 48 of trunnion 36 is engaged against channel wall 22, and the trunnion is non-rotatably anchored to enlargement 46 by a pin 50 (FIG. 8). The rearward end wall 52 of hollow block 42 is provided with an opening 54 to facilitate access to pin 50. The inner end portion 56 of the trunnion projects through an opening in channel wall 24 to the exposed position of FIG. 3 to facilitate assembly and disassembly of the leg structure and frame.

Figure 2:
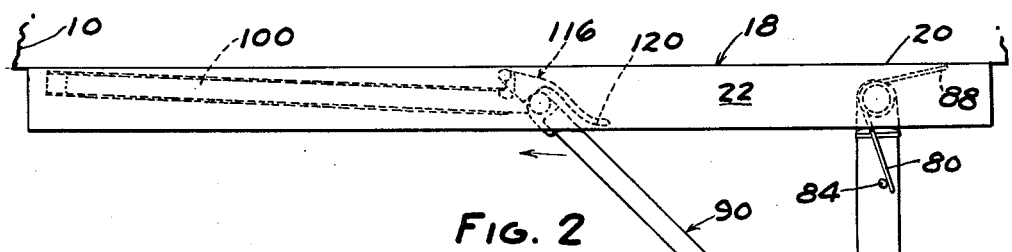
FIG. 2 is an enlarged side elevation of the landing gear with parts shown in phantom to illustrate structure.

Leg 32 includes an upper tubular section 58 which is secured to bearing 34 and a lower section 60, and these sections are interconnected in a conventional manner by a jackscrew 62 turned by a suitable operating handle 64 or the like for manually extending and shortening the leg sections as illustrated in solid and broken lines in FIG. 2. A ground-engaging foot 66 is pivotally connected to the lower end of leg 32 as at 68. This foot has a horizontally extending ground-engaging surface 70 and has a vertical height H which is relatively small as compared to the horizontal extent of surface 70. Foot 66 has a pair of upwardly extending lugs 72 for a purpose to be described.

Spring means are provided for urging leg 32 to swing in a direction clockwise as FIG. 2 is viewed from its downward vertical position to its upward retracted position. This spring means conveniently comprises a pair of coil springs 74 and 76 having respective end portions 78 and 80 engaged against oppositely extending lugs 82 and 84 on leg 32. These springs are coiled around bearing tube 34 and their opposite ends 86 and 88 respectively react against base portion 20 of channel 18.

A brace 90 is provided for supporting leg 32 in its downward position. This brace comprises two parallel elements 92 pivotally connected at their lower end portions to opposite sides of leg 32 as shown at 94. The upper ends of brace members 92 are secured to a cross member 96 having opposite end portions 98 which slidably and rotatably engage within guide channels 100 and 102 extending longitudinally within channel 18. The rearward end portions 104 and 106 respectively of the guide channels are anchored in place by such means as welding to base portion 20 of channel 18. The forward end portions 108 and 110 of the guide channels are anchored as by welding to blocks 112 and 114 in turn welded within the side walls of channel 18.

A single locking mechanism 116 is provided for locking the landing gear in both its downward position and its upward retracted position. This mechanism includes a shaft 118 pivotally supported by blocks 112 and 114 and an operating handle 120 extending away from the shaft. The shaft carries an eccentric shoulder 122 with an adjacent angled surface 123 and a pair of depending hooks 124 having cam surfaces 125. The locking mechanism is biased toward its downward locked position of FIGS. 2, 4, and 7 by stressed coil springs 126. Cross member 96 provides an abutment 128 engaged by shoulder 122 in the downward position of the landing gear and a pair of lugs 130 provided on leg member 32 is engaged by hooks 124 in the upward folded position of the gear.

In use it may be assumed that the landing gear initially is in the downward, load-bearing position shown in FIG. 1 and in dotted lines in FIG. 2. Abutment 128 provided by cross member 96 is engaged against shoulder 122 in the locking mechanism (FIG. 7) and shoulder 122 obstructs any movement of the cross piece in guide channels 100, 102. Thus, brace 90 forms a rigid strut for supporting leg 32 in its downward position. Springs 74 and 76 are held in torsion by engagement of their respective end portions with lugs 82, 84 on the leg and against top portion 20 of channel 18.

After the weight of the semi-trailer has been relieved from the landing gear as by coupling the semi-trailer to tractor 12 through fifth wheel 14, the landing gear may be retracted. Initially, handle 64 is turned to operate jackscrew 62 for retracting lower leg section 60 telescopingly upward relative to upper leg tube 58 until shoe 66 reaches the position illustrated in solid lines in FIG. 2.

The lock handle 120 is pushed upwardly to rock shoulder 122 out of engagement with crosspiece 96. Thereupon, coil springs 74, 76 swing leg 32 clockwise as FIGS. 1 and 2 are viewed, and during this movement, guides 98 on cross piece 96 both move rearwardly and rock or rotate in guide channels 100, 102. Springs 74, 76 exert sufficient force on leg 32 to swing it in its shortened condition clockwise through an angle of about 35° to 40°. The operator then manually swings the leg structure further clockwise until lugs 130 on the leg engage tapered portions 125 of hooks 124 and cam the hooks to one side. Then the hooks snap into engagement beneath the lugs under the action of springs 126. The leg is now locked in its upward folded condition.

During the later stages of upward swinging movement of the leg, the supporting force of springs 74, 76 continually decreases. However, these springs provide enough assistance so that a person of ordinary strength can easily push the leg upwardly to its locked position with one hand.

As leg 32 and brace 90 fold up into channel 18, portions of the leg nest between brace elements 92 as illustrated in FIGS. 4 and 5. Also, because of its pivotal mount, foot 66 pivots relative to leg 32 and retains its generally horizontal orientation. When the gear reaches its upward folded condition, studs 72 engage brace elements 92, and this positively secures the shoe in a horizontal orientation as shown in FIG. 4. Thus, it will be seen that the entire leg structure folds into a compact condition and is substantially entirely contained within the vertical limits of channel 18.

To lower the leg structure, operating handle 120 is merely pushed upwardly, thereby rocking hooks 124 out of engagement with lugs 130. This permits leg 32 to swing downwardly under the force of gravity. Springs 74, 76 are stressed torsionally during this movement and prevent the leg structure from slamming violently to the downward position. This protects the various parts of the landing gear from impact damage which might otherwise result.

In new landing gears, the resistance of springs 74, 76 is usually sufficient to prevent leg 32 from entirely reaching its downward position. After the landing gear has been used for some time, it loses some of its stiffness; and when the landing gear is released, it may swing all the way to its downward position. In any event, if the landing gear should fail to swing completely to its downward position under the force of gravity, the operator, assisted by the weight of leg 32, can easily push the gear the remaining distance to its downward locked position.

During the terminal part of downward movement, cross member 96 engages cam portion 123 of the locking lever and rocks it to one side to enable shoulder 122 to snap into engagement behind abutment 128 under the action of springs 126. This re-establishes the downward locked position of leg 32. Jackscrew 62 may then be operated in the manner described to extend leg section 60 downwardly until foot 66 is engaged against the ground and assumes the load of the semi-trailer. The support of tractor 12 may then be removed, and the semi-trailer leg structure will then support its forward end.

Channel 18 can be an integral part of a trailer frame or can be a separate member so that the entire landing gear structure as a unit can be added to a trailer. The channel could extend transversely of the trailer rather than longitudinally so that the gear would fold toward the center of the trailer rather than in a rearward direction. The off-center position of the leg assembly within channel 18 is incidental, this feature having been provided to meet a clearance requirement in a particular vehicle on which landing gear 16 was mounted.

I claim:
1. Landing gear structure for semi-trailers or the like comprising,
   means forming a channel-shaped frame member having spaced apart side walls,
   means forming a leg with a pivotal connection to said side walls so that said leg member can swing between a downward position and an upward retracted position,
   a brace having two laterally spaced elements, the lower end portions of which are pivotally connected to opposite sides of said leg, the upper end portions of said brace elements being connected to a cross member,
   means forming guides supported within the frame channel, said cross member having a sliding and swinging connection with said guides,
   lock means supported within said frame channel, said lock means being movable between a locking position and a releasing position,
   said lock means in its locking position and in said downward position of said leg member engaging said cross member to obstruct movement of said cross member in said guides for supporting said leg in said downward position,
   said lock means in said released position being disengaged from said cross member to free said leg for swinging toward said retracted position,
   said lock means being engageable with portions of said leg in said retracted position to secure said leg in said retracted position,
   said lock means being disengageable from said leg portions responsive to movement to said released position to free said leg for downward swinging movement,
   said leg having portions nested between said brace elements in said retracted position, and said leg and brace elements being substantially entirely contained within said channel in said retracted position to minimize the vertical space occupied thereby,
   means providing a ground-engaging foot pivoted onto the lower end portion of said leg and having a vertical height which is small as compared to the horizontal extent of its ground-engaging surface,
   and means within said channel engaging portions of said foot in retracted position of said leg,
   the latter said means being operable to retain said foot in a position with its ground-engaging surface extending generally horizontally, said foot in said retracted position being substantially completely contained within said channel whereby to minimize the vertical height of said structure when said leg is in retracted position.

2. The combination defined in claim 1 wherein said leg responsive to release by said lock means is free to swing from said retracted position thereof gravitationally toward said downward position,
   said structure also including spring means which becomes stressed responsive to downward swinging of said leg member whereby to diminish impact between parts of the structure when said leg member reaches said downward position, said spring means being operable when said leg member is in said downward position and said lock means is released to swing said element partially toward said retracted position thereof.

3. The combination defined in claim 1 wherein said lock means comprises an element pivotally mounted on said side walls, said element having a shoulder rockable to and from movement-obstructive relation with said cross member in said locking and released positions respectively, said element having hook means rockable to and from disengagement with lug means on said leg responsive to movement to said locking and released positions respectively for securing said leg in said retracted position and releasing it.

4. Landing gear structure for semi-trailers or the like comprising, a frame member, means forming a leg mounted on said frame member for swinging between a downward position and an upward retracted position, brace means having a swinging and sliding connection with said frame member and a swinging connection to said leg, a lock element rockably mounted on said frame member, said lock element having a shoulder in movement-obstructive relation to said brace means in the downward position of said leg, said shoulder being removable from the path of said brace means responsive to rocking of said element to free said leg for upward swinging, said element having hook means with a cam conformation, means on said leg operable to engage said cam conformation to swing said hook means to one side responsive to upward movement of said leg, said hook means being engageable with portions of said leg in said upward position thereof and being releasable therefrom responsive to rocking of said locking element, said locking element having an angled surface in the path of portions of said brace means, said portions of said brace means being operable responsive to downward swinging of said leg to engage said angled surface and swing said locking element to one side, said shoulder being engageable with said brace means after said portions thereof pass said angled surface.

5. The combination defined in claim 4 wherein said lock element is spring biased in a direction for engaging said shoulder and hook means respectively with said brace means and leg portions in downward and upward positions of said leg.

6. Landing gear structure for semi-trailers or the like comprising, a frame member, means forming a leg member mounted on said frame member for swinging between a downward position and an upward position, brace means having a swinging and sliding connection with said frame member and a swinging connection to said leg member, releasable lock means including an element pivotally mounted on said frame member, said element having a shoulder which obstructs sliding movement of said brace means in said downward position of said leg member for supporting said leg member in said downward position, said shoulder being disengageable from said brace means upon rocking of said element to release said leg member for swinging toward said retracted position thereof, said element having retaining means which releasably engages portions of said leg member in said retracted position thereof to secure said leg member against downward swinging movement, said leg member responsive to release of said lock means being freed to swing from said retracted position thereof gravitationally toward said downward position, and spring means which becomes stressed responsive to downward swinging of said leg member whereby to diminish impact between parts of the structure when said leg member reaches said downward position, said spring means being operable when said leg member is in said downward position and said lock means is released to swing said leg member partially toward said retracted position thereof.

7. The combination defined in claim 6 wherein said retaining means comprises hook means on said element, and said portions of said leg member engaged thereby include lug means in said leg member.

8. Landing gear structure for semi-trailers or the like comprising, a frame member, means forming a leg member mounted on said frame member for swinging between a downward position and an upward position, brace means having a swinging and sliding connection with one of said members and a swinging connection to the other of said members, a lock element pivotally mounted on one of said members, said element having a shoulder which obstructs sliding movement of said brace means in one of said positions of said leg member, said shoulder being disengageable from said brace means upon rocking of said element to release said leg member for swinging toward the other of said positions thereof, said element having retaining means which releasably engages portions of the other of said members in said other position of said leg member for releasably retaining said leg member in said other position.

9. The combination defined in claim 8 wherein said brace means has a swinging and sliding connection with said frame member and a swinging connection to said leg member, said lock element being mounted on said frame member and said shoulder obstructing sliding movement of said brace means in said downward position of said leg member, said retaining means releasably engaging portions of said leg member in said upward position thereof.

10. The combination defined in claim 9 and including in addition spring means operable to urge said leg member toward said upward position, said leg member and brace means in said retracted position exerting downward gravitational force exceeding the biasing force of said spring means so that when said lock element is released said leg member swings downwardly from said upward retracted position, said spring means becoming increasingly stressed responsive to downward swinging movement of said leg member, whereby to diminish impact between parts of the structure when said leg member reaches said downward position, said spring means being operable when said leg member is in said downward position and said lock element is released to swing said leg member partially toward said retracted position thereof.

11. Landing gear structure for semi-trailers or the like comprising, means forming a channel-shaped frame having spaced-apart side walls which define a vertical space, means forming a leg with a pivotal connection to said side walls so that said leg can swing between a downward position and an upward retracted position, means forming a brace, the lower end portion of which is pivotally connected to said leg, means forming a guide between side wall portions of said frame which slidably and swingably mounts the upper end of said brace for movement longitudinal of said frame between said side walls, said leg in said upward retracted position thereof having a portion which extends beyond the pivotal connection between said leg and brace toward said upper end of said brace, said leg portion and portions of said brace between its upper end and said pivotal connection being laterally offset from each other, said leg and brace being substantially entirely disposed within said vertical space in said upward retracted position of said leg with said laterally offset portions disposed side by side, and releasable lock means disposed generally centrally between the ends of said frame, said lock releasably engaging said leg to secure the same in said upward retracted position, said lock releasably engaging said brace for securing said leg in said downward position.

12. The combination defined in claim 11 wherein a ground-engaging foot is mounted on said portion of said leg, said ground-engaging foot being disposed substantially entirely within said vertical space beside said portions of said brace in upward retracted position of said leg.

13. The combination defined in claim 11 wherein a spring is mounted within said vertical space and is operable to urge said leg toward said upward position, said leg and brace in said retracted position exerting downward gravitational force exceeding the biasing force of said spring so that when said lock means is released said leg swings downwardly from said upward retracted position, said spring means becoming increasingly stressed responsive to downward swinging movement of said leg, whereby to diminish impact between parts of said structure when said leg reaches said downward position, said spring being operable when said leg is in said downward position and said lock means is released to swing said leg partially toward said upward position thereof.

References Cited in the file of this patent

UNITED STATES PATENTS

| | | |
|---|---|---|
| 1,868,021 | Nabors | July 19, 1932 |
| 1,930,802 | Hamilton | Oct. 17, 1933 |
| 2,863,670 | Larson | Dec. 9, 1958 |

FOREIGN PATENTS

| | | |
|---|---|---|
| 204,857 | Australia | May 17, 1956 |
| 648,105 | Great Britain | Dec. 28, 1950 |